2,847,000

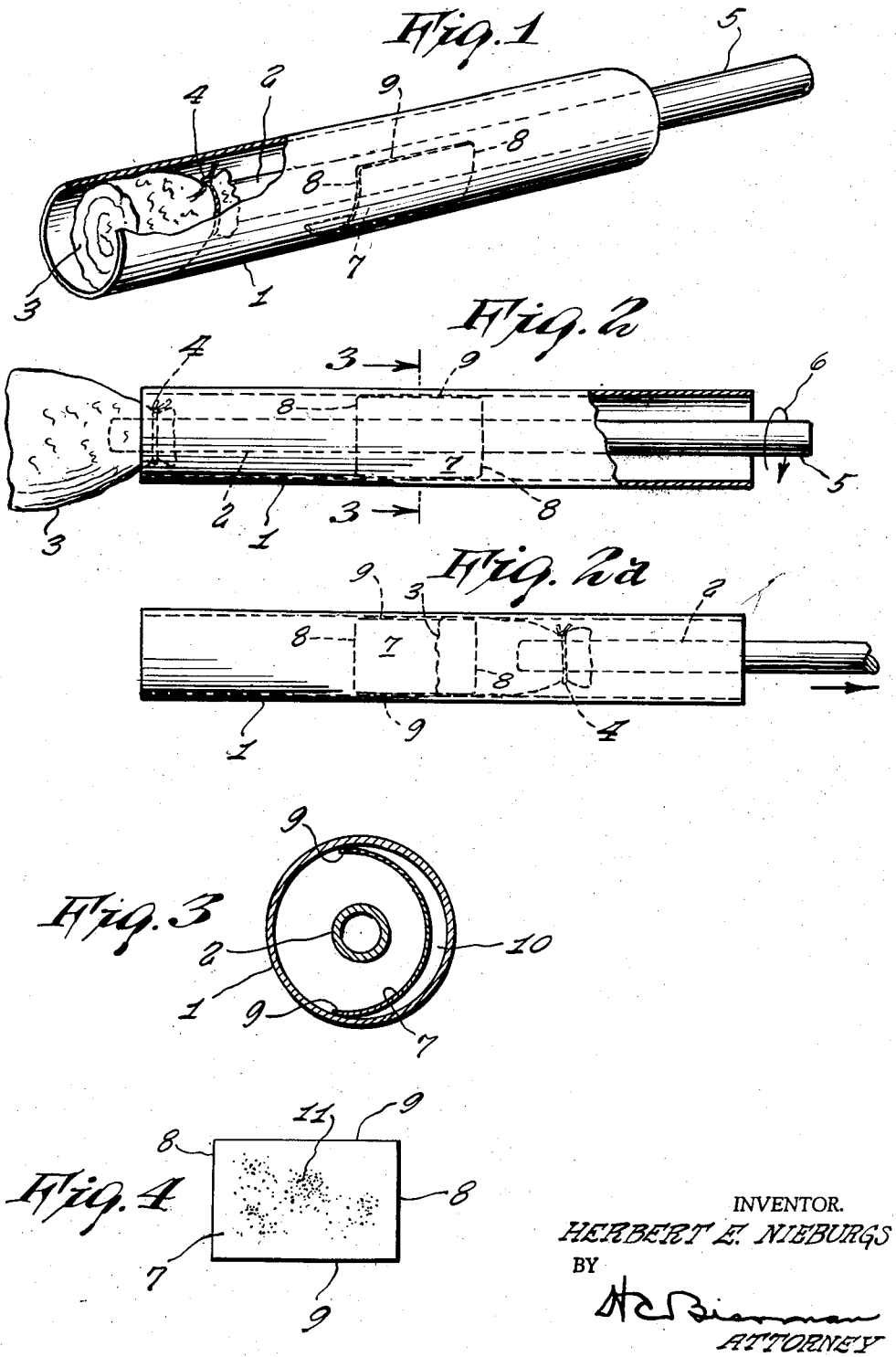
INVENTOR.
HERBERT E. NIEBURGS

United States Patent Office
Patented Aug. 12, 1958

2,847,000
DEVICE FOR OBTAINING BODY CELL SPECIMENS

Herbert E. Nieburgs, New York, N. Y.

Application July 2, 1957, Serial No. 669,648

5 Claims. (Cl. 128—2)

The present invention is directed to microscopic examination of body cells and more particularly to a simple device for obtaining specimens thereof for such examination.

In my co-pending application Serial No. 493,520, filed March 10, 1955, and entitled "Device for Cancer Detection," I have described a device and a method for obtaining body cell specimens and transferring the smear therefrom onto a slide for microscopic examination. The slide was held in a container which could be used as a shipping container for forwarding the specimen to a laboratory for microscopic examination. Such a device is suitable for use by inexperienced individuals and is intended for use by individuals for obtaining a specimen of their own.

This device has been successfully used and has a number of advantages over the prior art. However, it is desirable to improve upon this device in order to make it still more convenient and simple for self operation.

In view of the above, it is among the objects of the present invention to provide a simple and efficient device, including a slide as an element thereof, for taking of vaginal smears for microscopic examination, particularly with respect to possible cancerous cells.

It is also among the objects of the present invention to provide a device which eliminates the necessity for handling either the specimen or the slide and is adapted to facilitate the obtaining of reliable specimens by unskilled users.

It is further among the objects of the present invention to provide a device which is sturdy in construction, is of low cost, which can be easily manipulated and which is capable of being shipped in ordinary wrappers to the laboratory for examination without damage to the specimen or the slide.

In practicing the present invention, there is provided a tube having a plunger therein which is adapted for longitudinal and rotational movement. The plunger has at one end thereof a tampon and the overall length of the plunger is greater than the length of the tube. Within the tube is a flexible transparent slide, the width of which is not greater than the internal circumference of the tube and usually is about one-half of said circumference. The slide is usually made of a synthetic resinous material which is transparent and is resilient. The slide is placed within the tube by bending it, placing it centrally thereof and releasing it, whereby the inherent resilience of the slide tends to flatten it and is held within the tube along the lateral edges of the slide. It is preferable that the characteristics of the slide are such that it will contact the walls of the tube only at said edges.

In the accompanying drawing constituting a part hereof and in which like reference characters indicate like parts, Fig. 1 is a side elevational view of a device made in accordance with the present invention wherein the tampon is shown within the tube;

Fig. 2 is a view similar to Fig. 1, showing the tampon in extended position, some parts being broken away for clearness;

Fig. 3 is a transverse cross-sectional view of the device taken along line 3—3 of Fig. 2 and showing the relative positions of slide and tube, and Fig. 4 is a plan view of the slide containing a specimen and in flat position after having been removed from the tube.

Tube 1 may be made of any suitable material such as cardboard or fiber and is open at both ends. A plunger 2 which may also be made of cardboard is usually hollow and at one end is a tampon 3 secured within the tube at 4. Usually the tampon is of suitable fibrous material such as spun nylon. The overall length of plunger 2 and tampon 3 is such that when the latter is in extended position as shown in Fig. 2, the opposite end 5 extends out of the opposite end of tube 1 and provides a finger hold so that the plunger may be reciprocated or rotated, as shown by arrow 6.

Within tube 1 is slide 7 rectangular in shape having greater length than width. Side edges 9 contact the inner face of the tube whereas ends 8 thereof are out of contact with the tube leaving a space 10 therebetween.

In the operation of the device, the several elements are in the position shown in Fig. 1 and the user inserts the tube in the vaginal cavity, after which by manipulating end 5 of plunger 2, the tampon is extended as shown in Fig. 2. Then it is rotated as shown by arrow 6 to pick up a substantial number of body cells. End 5 is then retracted to the right and the tube 1 removed from the cavity. Then plunger 2 is retracted further until tampon 3 is in the area of slide 7. The plunger is further rotated to transfer the body cells from the tampon onto the slide, after which the plunger and tampon may be completely removed from tube 1 and discarded.

The tube may then be placed in an ordinary mailing tube and shipped to the laboratory for examination. The slide contains on the exposed face thereof cells 11. The tube may be made of sufficient strength so that it need only be wrapped in paper and addressed in order to be sent through the mails.

There are a number of advantages inherent in the present invention which make it a very efficient device. The slide being of flexible synthetic plastic material makes it impossible to break or crack even in the roughest of handling in transit. The method is simple and is easily operated by unskilled persons so that it may be used by the individual in remote places where laboratory facilities are not available, and shipped to the laboratory. Not only is it impossible to injure the slide but the cells thereon cannot be damaged. Due to the manner in which the slide is held in the tube, it compresses the tampon during the transfer of the body cells thereon and exerts a squeezing action which insures a proper smear on the slide.

Although the invention has been described setting forth a single embodiment thereof, certain details of structure and use may be varied without departing from the principles herein set forth. For instance, tube 1 may be made of other materials than cardboard or fiber such as synthetic plastics, metals, ceramics or other suitable materials. The shape thereof may be other than cylindrical and still accomplish the desired purpose. Plunger 2 is shown as hollow but it may be made of a solid material of any suitable type. It may be in the form of a stick or rod and it need not have a circular cross-section.

It has been found that a tube about five inches in length and about ⅝ inch in diameter, in which the plunger is about six inches in length and ¼ inch in diameter is an excellent size for general use. However, this is not essential and various sizes of these elements are suitable. The slide itself may be made of such synthetic plastics as vinyl acetate chloride copolymer or other transparent resilient material. Although the tampon is usually made of spun nylon, there are other materials which are also suitable for the purpose, such as cotton batting, synthetic sponge material, foamed elastic plastics and others.

As an additional feature, there may be provided a spacing means such as a ring placed approximately at the end of said slide nearest the handle of the plunger. The ring is fitted between the back of said slide and the internal wall of said tube and causes the slide to assume approximately a conical or frustro-conical shape. This shape causes the tampon to be thoroughly squeezed when it is drawn through the slide, thus producing an excellent smear.

In view of the above, the invention is to be broadly construed and not to be limited except by the character of the claims appended hereto.

I claim:

1. Device for obtaining body cell specimens for microscopic examination comprising an open ended tube, a plunger of smaller diameter within said tube and adapted for longitudinal movement therein, a tampon secured to one end of said plunger, a flexible transparent slide of a width less than the internal circumference of said tube, said slide being bent and held in said tube, said slide adapted to flatten when removed from said tube.

2. Device for obtaining body cell specimens for microscopic examination comprising an open ended tube, a plunger of smaller diameter within said tube and adapted for longitudinal movement therein, a tampon secured to one end of said plunger, the length of said plunger plus tampon being greater than the length of said tube, a flexible transparent slide of a width less than the internal circumference of said tube, said slide being bent and held in said tube, said slide adapted to flatten when removed from said tube.

3. Device for obtaining body cell specimens for microscopic examination comprising an open ended tube, a plunger of smaller diameter within said tube and adapted for longitudinal movement therein, a tampon secured to one end of said plunger, the diameter of said tampon being of such size as to fit snugly in said tube, a flexible transparent slide of a width less than the internal circumference of said tube, said slide being bent and held in said tube, said slide adapted to flatten when removed from said tube.

4. Device for obtaining body cell specimens for microscopic examination comprising an open ended tube, a plunger of smaller diameter within said tube and adapted for longitudinal movement therein, a tampon secured to one end of said plunger, said tube and plunger being circular in cross-section, a flexible transparent slide of a width not more than the internal circumference of said tube, said slide being bent and held in said tube, said slide adapted to flatten when removed from said tube.

5. Device for obtaining body cell specimens for microscopic examination comprising an open ended tube, a plunger of smaller diameter within said tube and adapted for longitudinal movement therein, a tampon secured to one end of said plunger, a flexible transparent slide of a width not more than the internal circumference of said tube, said slide being bent and held in said tube, said slide contacting the walls of said tube only along the longitudinal edges of said slide, said slide adapted to flatten when removed from said tube.

References Cited in the file of this patent

Thornton, Journal of the American Medical Association, vol. 159, No. 12, November 1955 (pages 1177–8).